United States Patent Office 3,509,710
Patented May 5, 1970

3,509,710
REINFORCED RUBBER ARTICLES
Glyn B. Redmond, Erdington, England, assignor to The Dunlop Company Limited, St. James, England, a British company
No Drawing. Filed Sept. 25, 1967, Ser. No. 670,424
Claims priority, application Great Britain, Oct. 7, 1966, 44,863/66
Int. Cl. B29h *17/28*
U.S. Cl. 57—153                                          5 Claims

ABSTRACT OF THE DISCLOSURE

A rubber article, particularly a pneumatic tire reinforced by metallic cords, the individual wires of which have a diameter less than 0.010 inch. The wires are arranged in strands which have a helix angle greater than $\cos^{-1} 0.95$, and have a twist of no more than $\pm 20\%$ of the cord as they lie in the cord.

---

This invention relates to reinforced rubber articles and particularly to pneumatic tires.

It is already known to reinforce pneumatic tire by means of steel wire cords, stiff wires being used to make up the words, the wires being twisted together with a low degree of twist, for example, of the order of 3 turns per inch giving a helix angle for the usual diameter of cord of the order of 13°. In operation of these cords buckling is resisted largely by the inherent stiffness of the individual wires and collapse of the cords under compression can occur and will produce disastrous results, the tire in which they are incorporated rapidly breaking up in operation.

It is an object of the present invention to provide an improved reinforced rubber article.

According to the present invention a reinforced rubber article comprises a reinforcing ply or layer incorporating metallic cords embedded in rubber or rubber-like material, the individual wires of strands comprising the said cords being of a diameter less than 0.010 inch and the strands being folded together to provide a helix angle $\theta$, as defined herein, the cosine of which is smaller than 0.95, said strands also having a twist, as they each lie in the cord, of no more than $\pm 20\%$ of the cord twist.

Preferably, the strands have substantially zero twist.

Preferably also, the diameter of the wires is about 0.001 inch.

The helix angle $\theta$, as referred to herein is that angle which has the cosine ratio represented by the ratio of the twisted cord length to the untwisted strand length.

The strand twist as it lies in the cord referred to herein may be measured in the following manner:

(i) Clamp a suitable length of cord (e.g., 10 inches) between the two jaws of a conventional textile twist tester.

(ii) Cut away in turn all but one of the strands of the cord. This is done by cutting one end of a strand, unwrapping it from one end of the cord and finally cutting the remaining attached end.

(iii) Measure the number of turns of twist in the remaining strand. The twist of that strand "as it lies in the cord" is then expressed in turns of twist per inch.

Preferably also, the reinforced rubber article referred to in the preceding paragraphs comprises a pneumatic tire.

Embodiments of the invention will now be described.

In a first example two strands are utilised each consisting of 188 steel wires of 0.001 inch diameter. Each strand is twisted about its own axis with an S form of twist of twelve turns per inch. The two strands are folded together with Z form of twist of twelve turns per inch to provide a cord with a helix angle of about 33½°.

In a second example two strands are utilised each consisting of 250 steel wires each of 0.001 inch diameter. Each strand, in this example, is twisted about its own axis with an S form of twist of eight turns per inch. The two strands are folded together with a Z twist of eight turns per inch to provide a cord with a helix angle of about 25°.

The cords resulting from the first example are incorporated in the carcass plies and/or breaker plies of a cross-biased tire construction or, alternatively, in the carcass plies, only, of a radial ply tire construction. On the other hand, the cords of the second example are suitable for use in low-angle breaker reinforcing layers in a radial ply tire construction.

Both of the above examples of cord construction may be manufactured on conventional textile machinery but for cords incorporating thicker diameter wires (e.g., .006 inch) the use of conventional wire cabling machinery is preferred.

It is an advantage of the present invention that the steel cords produced, when incorporated in reinforced rubber articles, provide a greater degree of flexibility and resistance to buckling than a comparable metallic cord utilising larger diameter individual wires and a low degree of twist. The fatigue resistance of the cords made in accordance with the invention is also higher than with previously known comparable cords.

It is, therefore, possible in view of the improved performance and properties of the metallic cords in accordance with the invention to utilise, for a given performance, a smaller number of layers than would be used with the prior known metallic cord reinforcement.

Having now described my invention, what I claim is:

1. A reinforced rubber article comprising a reinforcing ply or layer incorporating metallic cords embedded in rubber or rubber-like material, the individual wires of strands comprising the said cords being of a diameter less than 0.010 inch and the strands being folded together to provide a helix angle $\theta$, said angle being that angle which has the cosine ratio represented by the ratio of the twisted cord length to the untwisted strand length, the cosine of which is smaller than 0.95, said strands also having a twist, as they each lie in the cord, of no more than $\pm 20\%$ of the cord twist.

2. A reinforced rubber article according to claim 1 wherein the strands have a twist, as they each lie in the cord, which is substantially zero.

3. A reinforced rubber article according to claim 1 wherein the diameter of each wire is approximately .001 inch.

4. A reinforced rubber article according to claim 1 wherein the cords are steel.

5. A reinforced rubber article according to claim 1 which is a pneumatic tire.

References Cited

UNITED STATES PATENTS

| 1,444,076 | 2/1923 | Jury | 152—359 |
| 2,143,694 | 1/1939 | Hauvette | 152—359 X |
| 2,423,995 | 7/1947 | Reynolds | 152—359 |
| 2,586,795 | 2/1952 | Drisch et al. | 152—359 |
| 3,233,648 | 2/1966 | Kovac et al. | 152—359 |
| 3,253,638 | 5/1966 | Kersker et al. | 152—359 |
| 3,419,059 | 12/1968 | Bridge | 152—359 |

ROBERT F. BURNETT, Primary Examiner

R. L. MAY, Assistant Examiner

U.S. Cl. X.R.

57—149; 152—359; 161—144, 175